US012355142B2

(12) United States Patent
Han et al.

(10) Patent No.: US 12,355,142 B2
(45) Date of Patent: Jul. 8, 2025

(54) ELECTRONIC DEVICE COMPRISING ANTENNA

(71) Applicant: Samsung Electronics Co., Ltd., Suwon-si (KR)

(72) Inventors: Taegyeong Han, Suwon-si (KR); Dongjin Lee, Suwon-si (KR); Myeounghyeoun Do, Suwon-si (KR); Juntaek Oh, Suwon-si (KR); Daegi Yi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 256 days.

(21) Appl. No.: 18/138,703

(22) Filed: Apr. 24, 2023

(65) Prior Publication Data

US 2023/0387573 A1 Nov. 30, 2023

Related U.S. Application Data

(63) Continuation of application No. PCT/KR2022/008927, filed on Jun. 23, 2022.

(30) Foreign Application Priority Data

Jun. 24, 2021 (KR) ........................ 10-2021-0082489

(51) Int. Cl.
*H01Q 1/27* (2006.01)
*H01Q 1/38* (2006.01)
*H04R 1/10* (2006.01)

(52) U.S. Cl.
CPC ............... *H01Q 1/273* (2013.01); *H01Q 1/38* (2013.01); *H04R 1/1016* (2013.01);
(Continued)

(58) Field of Classification Search
CPC .......... H01Q 1/24; H01Q 1/241; H01Q 1/243; H01Q 1/27; H01Q 1/273; H01R 1/1016;
(Continued)

(56) References Cited

U.S. PATENT DOCUMENTS 10,827,249 B1 * 11/2020 Pine ..................... H04R 1/1041
11,310,581 B1 * 4/2022 Shanmugam ............ H01Q 9/40
(Continued)

FOREIGN PATENT DOCUMENTS

CN 206076479 U 4/2017
KR 101128434 B1 3/2012
(Continued)

OTHER PUBLICATIONS

International Search Report and Written Opinion for International Application No. PCT/KR2022/008927; International Filing Date Jun. 23, 2022; Date of Mailing Oct. 7, 2022; 40 pages.

*Primary Examiner* — Jason M Crawford
(74) *Attorney, Agent, or Firm* — CANTOR COLBURN LLP

(57) ABSTRACT

An electronic device includes a first housing connected to a second housing having a protrusion configured to be seated on an ear. The electronic device also includes a printed circuit board, a wireless communication circuit, an antenna carrier disposed in internal space defined by the first housing and the second housing. The electronic device also includes a conductive pattern formed over the first surface and the second surface through a first through hole and electrically connected to the wireless communication circuit. The antenna carrier includes a first surface, a second surface opposite to the first surface, and through holes passing through the antenna carrier. The antenna carrier also includes a groove structure including a portion in contact with a second through hole and formed on the second surface of the antenna carrier. The wireless communication
(Continued)

circuit transmits and/or receives a wireless signal by providing power to the conductive pattern.

20 Claims, 11 Drawing Sheets

(52) U.S. Cl.
CPC ......... *H04R 1/1041* (2013.01); *H04R 1/1075* (2013.01); *H04R 2420/07* (2013.01); *H04R 2460/11* (2013.01)

(58) Field of Classification Search
CPC .. H01R 1/1041; H01R 1/1058; H01R 1/1066; H01R 1/1075; H01R 2420/07; H01R 2225/51
See application file for complete search history.

(56) References Cited

U.S. PATENT DOCUMENTS

| | | | | |
|---|---|---|---|---|
| 2008/0206393 | A1 | 8/2008 | Kim | |
| 2009/0162957 | A1 | 6/2009 | Joung | |
| 2016/0050474 | A1* | 2/2016 | Rye | H05K 7/1427 381/152 |
| 2017/0062913 | A1* | 3/2017 | Hirsch | H04B 5/26 |
| 2017/0180844 | A1* | 6/2017 | Nanni | H04W 76/10 |
| 2018/0241117 | A1* | 8/2018 | Hirsch | H04B 5/72 |
| 2020/0021905 | A1* | 1/2020 | Briggs | H04R 1/1066 |
| 2020/0107105 | A1 | 4/2020 | Feng et al. | |
| 2020/0221209 | A1* | 7/2020 | Grebe | H01M 50/216 |
| 2020/0221210 | A1* | 7/2020 | Grebe | H01Q 1/40 |
| 2020/0374621 | A1 | 11/2020 | Huang | |
| 2021/0014598 | A1* | 1/2021 | Pine | H04R 1/1041 |
| 2021/0037307 | A1* | 2/2021 | Huang | H01L 23/552 |
| 2021/0044885 | A1* | 2/2021 | Fukahori | H01Q 1/273 |
| 2021/0250676 | A1* | 8/2021 | Kim | H04R 1/1041 |
| 2021/0289280 | A1* | 9/2021 | Ko | H04R 1/1075 |
| 2023/0188878 | A1* | 6/2023 | Lee | H04M 1/0277 381/91 |
| 2023/0275344 | A1* | 8/2023 | Hsu | H04R 1/1075 343/702 |
| 2023/0284400 | A1* | 9/2023 | Lee | H05K 1/14 361/752 |
| 2023/0352816 | A1* | 11/2023 | Lee | G06F 1/16 |
| 2023/0387573 | A1* | 11/2023 | Han | H01Q 1/38 |
| 2024/0056116 | A1* | 2/2024 | Kang | H04B 1/385 |
| 2024/0322421 | A1* | 9/2024 | Choi | H04R 1/1016 |
| 2024/0405409 | A1* | 12/2024 | Oh | H04R 1/1075 |
| 2024/0429595 | A1* | 12/2024 | Lee | H01Q 1/2291 |

FOREIGN PATENT DOCUMENTS

| | | | |
|---|---|---|---|
| KR | 101370498 | B1 | 3/2014 |
| KR | 20140038868 | A | 3/2014 |
| KR | 20150115529 | A | 10/2015 |
| KR | 20180129126 | A | 12/2018 |
| KR | 102059417 | B1 | 12/2019 |
| KR | 102292933 | B1 | 8/2021 |

* cited by examiner

ELECTRONIC DEVICE COMPRISING ANTENNA

CROSS-REFERENCE TO RELATED APPLICATION(S)

This application is a continuation application, claiming priority under § 365(c), of an International Application No. PCT/KR2022/008927, filed on Jun. 23, 2022, which is based on and claims the benefit of a Korean patent application number 10-2021-0082489, filed on Jun. 24, 2021, in the Korean Intellectual Property Office, the disclosure of which is incorporated by reference herein in its entirety.

FIELD

Embodiments disclosed herein relate to an electronic device including an antenna.

DESCRIPTION OF RELATED ART

Electronic devices (e.g., a mobile terminal, a smartphone, or a wearable device) may provide various functions. For example, in addition to a basic voice communication function, a smartphone may provide various functions such as a short-range wireless communication (e.g., Bluetooth™, Wi-Fi, or near field communication (NFC)) function, a mobile communication (3rd generation (3G), 4G, or 5G) function, a music or video playback function, an imaging function, or a navigation function.

Recently, interest in various accessory devices that operate in conjunction with an electronic device wirelessly is increasing. In particular, wearable electronic devices capable of providing voice information and being worn on or in an ear have been released in various forms. An ear-wearable electronic device may include an antenna for performing wireless communication with an external electronic device (e.g., a terminal).

An antenna included in the ear-wearable electronic device may be formed in a conductive pattern on an antenna carrier. The antenna carrier may be formed through injection molding.

SUMMARY

When a dielectric material (e.g., resin) for double injection molding (e.g., insert injection molding) is injected onto an antenna carrier included in an ear-wearable electronic device, problems may occur in that gas is collected in a place that is to be filled with a dielectric material or the flow of the dielectric material is stagnant due to a structure that hinders the flow of the dielectric material.

When the dielectric material is stagnant inside the ear-wearable electronic device, the gas within the electronic device may not be discharged, which may result in structural defects (e.g., a weld line) on the external appearance of the electronic device.

An ear-wearable electronic device according to various embodiments includes a first housing, a second housing including a protrusion configured to be seated on an ear and connected to the first housing. The electronic device also includes a printed circuit board disposed in an internal space defined by the first housing and the second housing, a wireless communication circuit disposed on the printed circuit board, an antenna carrier disposed in the internal space, and a conductive pattern formed over the first surface and the second surface through a first through hole among the through holes and electrically connected to the wireless communication circuit. The antenna carrier includes a first surface facing the protrusion, a second surface opposite to the first surface, and a plurality of through holes passing through the antenna carrier. The antenna carrier also includes a groove structure having a portion that is in contact with a second through hole of plurality of the through holes and formed in an area of the second surface of the antenna carrier. The wireless communication circuit is configured to transmit and/or receive a wireless signal by providing power to the portion of the conductive pattern located on the first surface.

A wearable electronic device according to various embodiments include a first housing, a second housing including a protrusion configured to be seated on an ear and connected to the first housing. The wearable electronic device also includes a printed circuit board disposed in an internal space defined by the first housing and the second housing, a wireless communication circuit disposed on the printed circuit board, an antenna carrier disposed in the internal space, and a conductive pattern formed over the first surface and the second surface through a first through hole of a plurality of through holes and electrically connected to the wireless communication circuit. The antenna carrier includes a first surface facing the protrusion, a second surface opposite to the first surface, and a plurality of through holes passing through the antenna carrier, a groove structure including a portion that is in contact with a second through hole among the through holes and formed in an area of the second surface of the antenna carrier. at least a portion of the second through hole may be filled with a dielectric material having a specific dielectric constant, and the wireless communication circuit may be configured to transmit and/or receive a wireless signal by providing power to one point of the conductive pattern located on the first surface.

According to various embodiments of the disclosure, even when a dielectric material for double injection mold is injected onto an antenna carrier of an ear wearable electronic device, a structural defect may not occur in the external appearance of the electronic device.

In addition, various effects directly or indirectly identified through the disclosure may be provided.

DETAILED DESCRIPTION

Various embodiments disclosed herein include a structure in which a structural defect due to a dielectric material does not occur in an ear-wearable electronic device.

Hereinafter, various embodiments of the disclosure will be described with reference to the accompanying drawings. However, it shall be understood that it is not intended to limit the disclosure to specific embodiments, and that the disclosure includes various modifications, equivalents, or alternatives of the embodiments of the disclosure.

Figure 1:
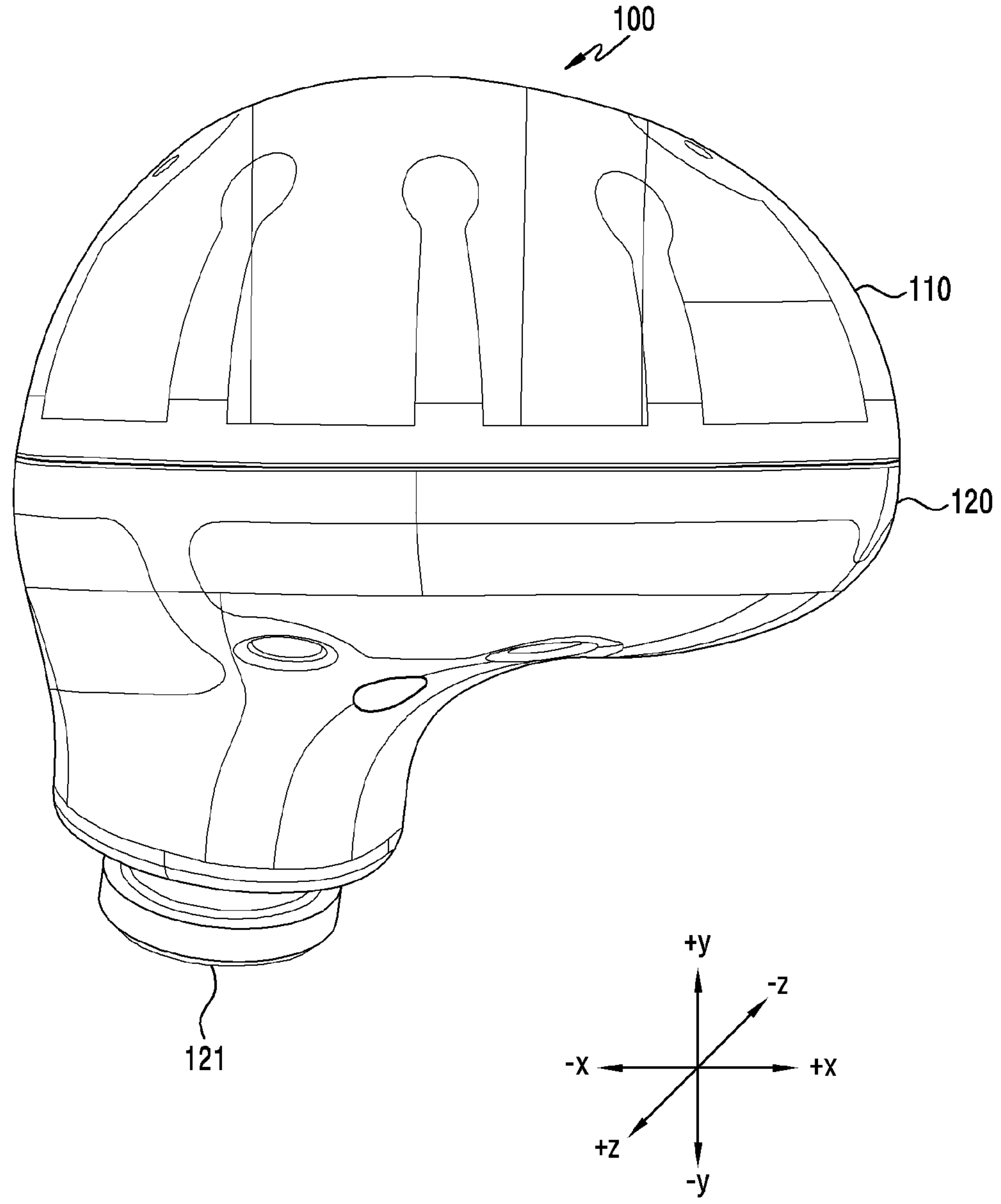
FIG. 1 is a perspective view of an electronic device according to various embodiments.

FIG. 1 is a perspective view of an electronic device 100 according to various embodiments.

Referring to FIG. 1, the electronic device 100 may include a first housing 110 and a second housing 120 connected to the first housing 110.

According to an embodiment, the electronic device 100 may be worn on an ear of a user of the electronic device 100.

According to an embodiment, the first housing 110 and the second housing 120 may include curved surfaces each having a specific curvature. In an example, the first housing may extend seamlessly from one end to be connected to the second housing 120. For example, the first housing 110 and the second housing 120 may be configured to come into contact with each other on the xy plane.

According to an embodiment, the first housing 110 or the second housing 120 may be formed of coated or colored glass, ceramic, polymer, metal (e.g., aluminum, stainless steel (STS), or magnesium), resin (e.g., polycarbonate, polyethylene, polypropylene, or polystyrene), or a combination of at least two of the above-mentioned materials. In an example, the first housing 110 and the second housing 120 may be formed through injection molding.

According to an embodiment, the second housing 120 may include a protrusion 121 that is configured to be seated in or on an ear of a user who uses the electronic device 100. In an example, the protrusion 121 may be provided to extend in the −y direction from the second housing 120.

The electronic device 100 illustrated in FIG. 1 corresponds to an example and does not limit the shape of the device to which the technical idea disclosed herein is applied. The technical idea disclosed herein is applicable to various types of wearable electronic devices including a protrusion to be seated on an ear. For example, the technical idea disclosed herein may also be applied to a wearable electronic device in the shape of a kidney bean.

Hereinafter, various embodiments will be described with reference to the electronic device 100 illustrated in FIG. 1 for convenience of description.

Figure 2:
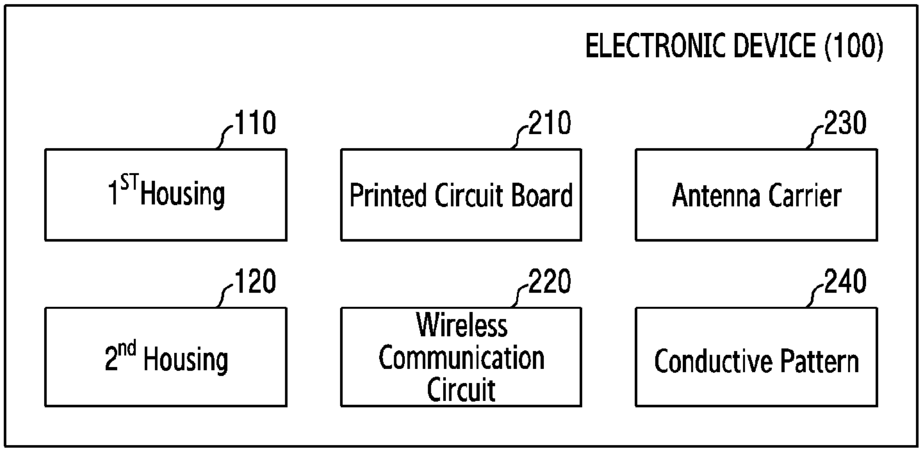
FIG. 2 is a block diagram that illustrates a hardware configuration of the electronic device according to various embodiments of the disclosure.

FIG. 2 illustrates a hardware configuration of the electronic device 100 according to various embodiments of the disclosure.

Referring to FIG. 2, the electronic device 100 may include a printed circuit board 210, a wireless communication circuit 220, an antenna carrier 230, and/or a conductive pattern 240 that are disposed in an internal space defined by the first housing 110 and the second housing 120.

According to an embodiment, the wireless communication circuit 220 may be disposed on the printed circuit board 210. In an example, the wireless communication circuit 220 may be electrically connected to the conductive pattern 240, and may transmit a radio frequency (RF) signal or receive an RF signal.

According to an embodiment, the antenna carrier 230 may be formed of a non-conductive material (e.g., through injection molding). The non-conductive material provided on the antenna carrier 230 (e.g., through injection molding) may correspond to a dielectric material having a dielectric constant. In an example, a dielectric material having a specific dielectric constant may be provided on at least a portion of the antenna carrier 230.

According to an embodiment, the conductive pattern 240 may be provided on the antenna carrier 230. In an example, the conductive pattern 240 may be provided on the antenna carrier 230 through a laser direct structuring (LDS) method.

According to an embodiment, the wireless communication circuit 220 may transmit and/or receive a wireless signal by using the conductive pattern 240 by providing power to the conductive pattern 240. In an example, the conductive pattern 240 may operate as an antenna radiator.

According to an embodiment, the electronic device 100 may further include components other than the components illustrated in FIG. 2. In an example, the internal space defined by the first housing 110 and the second housing 120 may further include a battery and/or a speaker. The arrangement structure of the battery and the speaker will be described in more detail with reference to FIG. 3.

Figure 3:
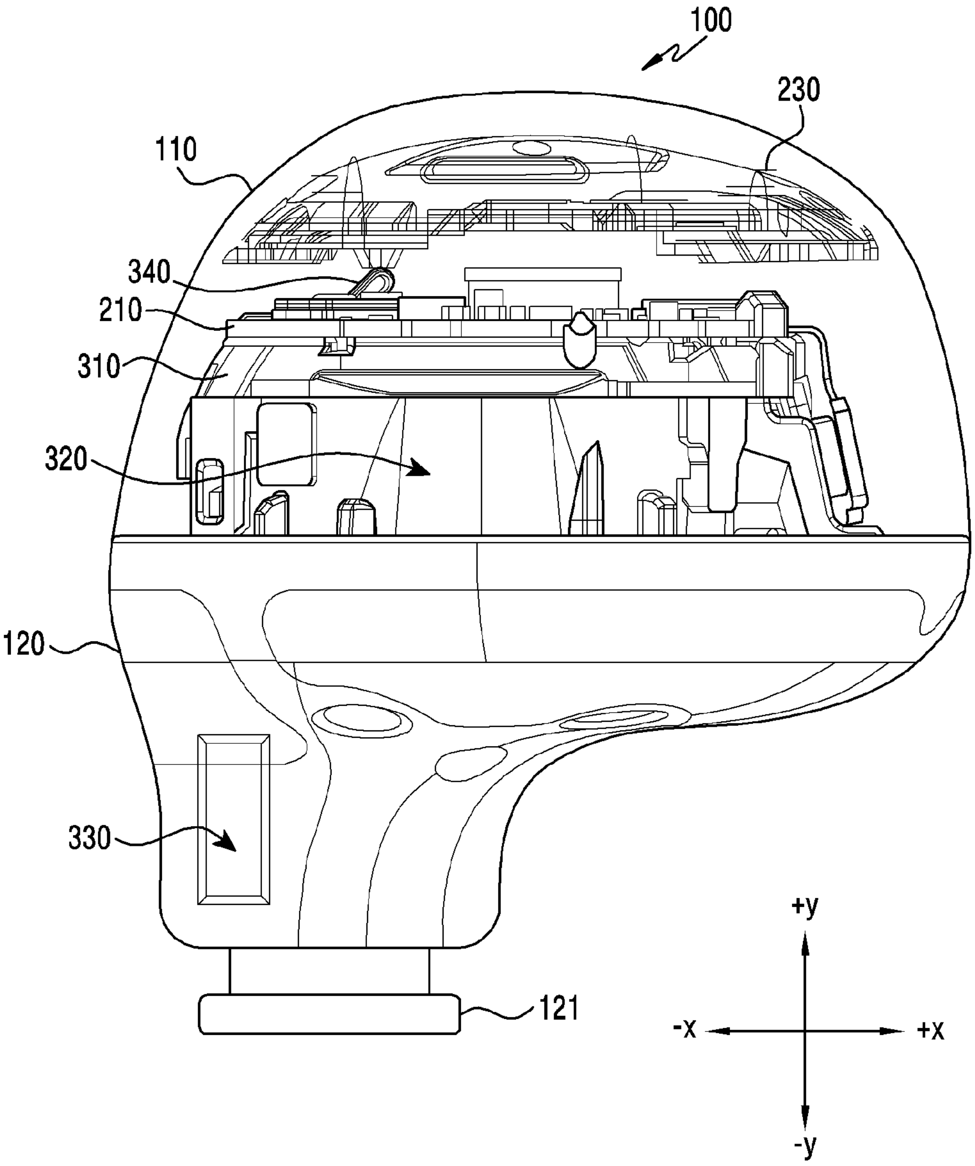
FIG. 3 is a cross-sectional side view of the electronic device according to various embodiments.

FIG. 3 is a cross-sectional side view of the electronic device 100 according to various embodiments. In an example, the cross-sectional view of FIG. 3 may be understood as illustrating a side view of the electronic device 100 of FIG. 1 viewed in the −z direction.

Referring to FIG. 3, inside the first housing 110, an antenna carrier 230, a printed circuit board 210, a support member 310, a battery 320, a speaker 330, and/or a conductive connection member 340 may be disposed. In addition, the speaker 330 may be disposed inside the second housing 120.

According to an embodiment, the antenna carrier 230 may be disposed inside the first housing 110 while being located far away from the protrusion 121. In an example, since the conductive pattern 240 (not shown) included in the antenna carrier 230 is disposed adjacent to the first housing 110, the wireless communication circuit 220 may perform wireless communication by using the conductive pattern 240 (not shown).

According to an embodiment, the conductive connection member 340 may electrically connect the printed circuit board 210 and the conductive pattern 240 to each other. In an example, the wireless communication circuit 220 (not shown) disposed on the printed circuit board 210 may feed power to the conductive pattern 240 (not shown) via the conductive connection member 340 electrically connected to the printed circuit board 210.

According to an embodiment, the printed circuit board 210 may be seated inside the first housing 110 by the support member 310. In an example, the support member 310 may be a plastic or metallic member.

According to an embodiment, the battery 320 may be disposed adjacent to the support member 310. In an example, the battery 320 may be disposed inside the first housing 110 to be adjacent to the second housing 120.

According to an embodiment, the speaker 330 may be disposed inside the second housing 120 to be adjacent to the protrusion 121. In an example, the speaker 330 may transmit a voice signal to the user of the electronic device 100 through the protrusion 121.

Figure 4A:
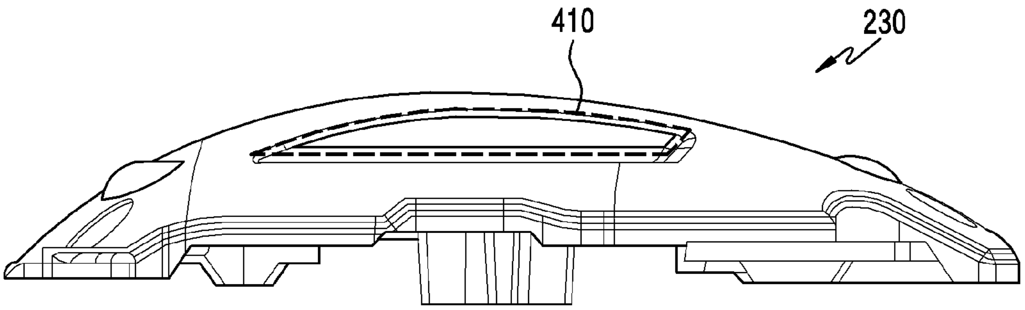
FIG. 4A is a side view of an antenna carrier according to an embodiment.

FIG. 4A is a side view of an antenna carrier 230 according to an embodiment.

Figure 4B:
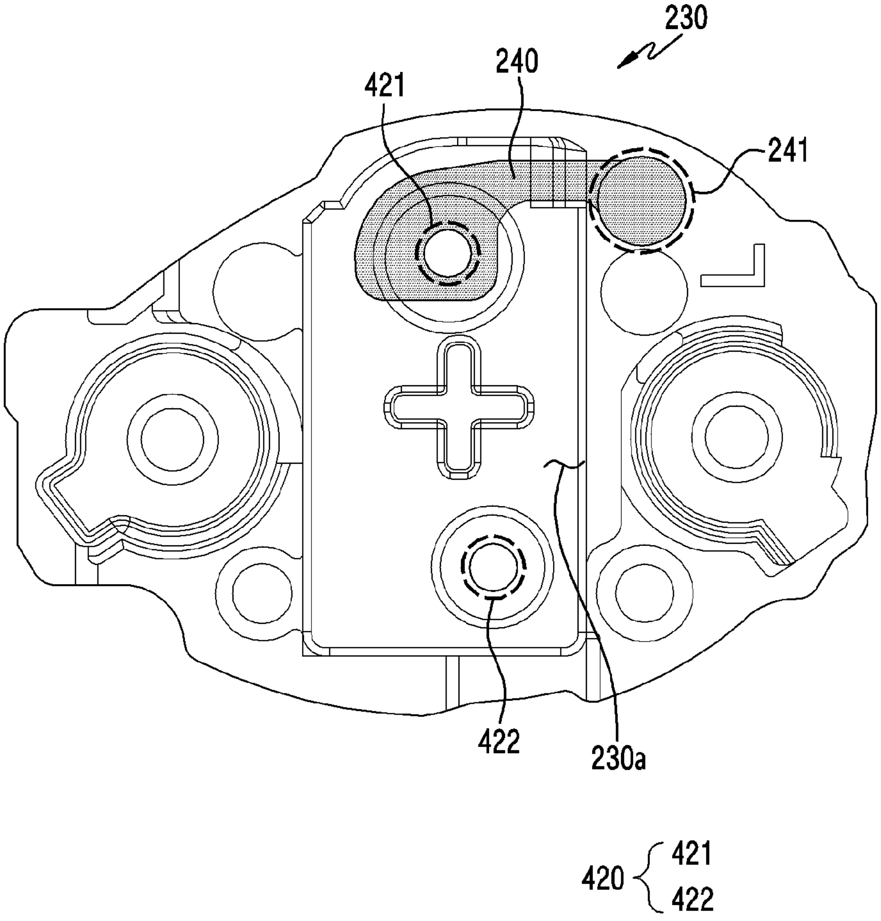
FIG. 4B illustrates a first surface of the antenna carrier according to an embodiment.

FIG. 4B illustrates a first surface 230*a* of the antenna carrier 230 according to an embodiment.

Figure 4C:
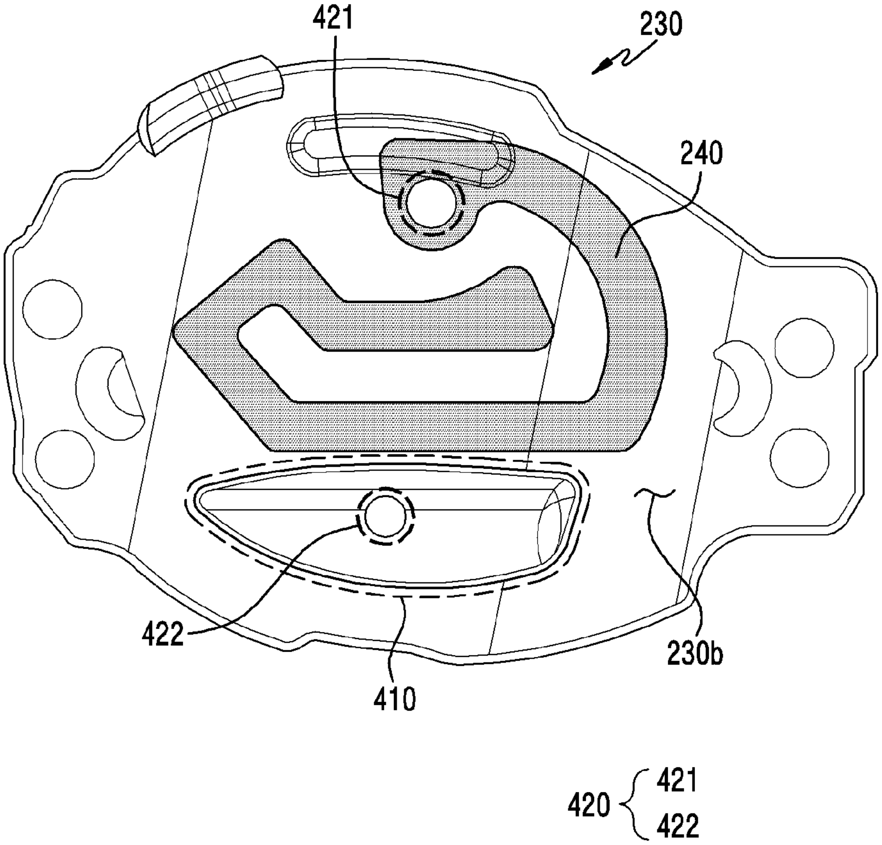
FIG. 4C illustrates a second surface of the antenna carrier according to an embodiment.

FIG. 4C illustrates a second surface 230*b* of the antenna carrier 230 according to an embodiment.

Referring to FIG. 4A, 4B, or 4C, when the antenna carrier 230 is mounted inside the electronic device 100, the antenna carrier 230 may include a first surface 230*a* facing towards the protrusion 121 and a second surface 230*b* opposite to the first surface 230*a*, i.e., facing away from the protrusion 121.

According to an embodiment, the antenna carrier 230 may be provided with a conductive pattern 240, a groove structure 410, and a plurality of through holes 420.

According to an embodiment, at least a portion of the groove structure 410 may be provided in a flat groove shape. In an example, one end of the groove structure 410 is seamlessly connected to the second surface 230*b* of the antenna carrier 230, and the other end of the groove structure 410 may be provided to have a specific height difference relative to the second surface 230*b* of the antenna carrier 230.

According to an embodiment, the plurality of through holes 420 may include a first through-hole 421 and a second through hole 422. In an example, the first through hole 421 and the second through hole 422 may be provided at positions spaced apart from each other in the antenna carrier 230.

According to an embodiment, the conductive pattern 240 may be provided over the first surface 230*a* of the antenna carrier 230 and the second surface 230*b* of the antenna carrier 230 through the first through hole 421. In an example, the conductive pattern 240 may be disposed on at least a portion of the first surface 230*a* and at least a portion of the second surface 230*b* along at least a portion of the wall of the first through hole 421.

According to an embodiment, the first portion 241 of the conductive pattern 240 may be electrically connected to the conductive connection member 340 illustrated in FIG. 3. In an example, the wireless communication circuit 220 disposed on the printed circuit board 210 may provide power to the conductive pattern 240 via the first portion 241 of the conductive pattern 240 that is in contact with the conductive connection member 340 electrically connected to the printed circuit board 210.

According to an embodiment, the conductive pattern 240 may be provided on the antenna carrier 230 in various shapes. In an example, the conductive pattern 240 may be provided on the first surface 230*a* of the antenna carrier 230 to surround the first through hole 421. In another example, the conductive pattern 240 may be provided adjacent to and along an edge of the antenna carrier 230.

According to an embodiment, the groove structure 410 may be provided on at least a portion of the second surface 230*b* of the antenna carrier 230 including a portion that is in contact with the second through hole 422. In an example, when the first surface 230*a* is viewed from the second surface 230*b*, the second through hole 422 may be included in an area of the second surface 230*b* on which the groove structure 410 is provided.

According to an embodiment, the diameter of the through holes 420 may be within a specific range of length (e.g., about 0.8 mm). In an example, when the diameter of the through holes 420 is about 0.73 mm, the electronic device 100 may have rigidity in a crack and drop test.

According to an embodiment, the gas within the electronic device 100 may be discharged through the second through hole 422. In an example, when double injection molding (e.g., insert injection molding) is performed inside the electronic device 100, the gas generated in the vicinity of the second surface 230*b* of the antenna carrier 230 due to the injection molding can be discharged by passing through the second through hole 422.

According to an embodiment, the antenna carrier 230 included in the electronic device 100 may be formed of injection material (for example, a non-conductive material).

According to an embodiment, when a dielectric material (e.g., resin) for double injection molding is injected into the antenna carrier 230, the second through hole 422 and the groove structure 410 may prevent the dielectric material from being stagnant in an inner area of the electronic device 100 that is filled with the dielectric material. In an example, in the electronic device 100 including the antenna carrier 230 in which the second through hole 422 and the groove structure 410 are provided, it is possible to prevent the occurrence of a structural defect (e.g., a weld line) of the external appearance of the electronic device 100 by preventing the dielectric material from being stagnant.

According to an embodiment, the conductive pattern 240 may be formed at a position that is spaced apart from the second through hole 422 as much as possible. Due to this, as the conductive pattern 240 is spaced apart from the second through hole 422 close to the tragus or fossa of an ear, the electronic device 100 may minimize the effect of radiation of an RF signal emitted through the conductive pattern 240 on a human body.

According to an embodiment, the first through hole 421 may be filled with a dielectric material having a specific dielectric constant, except for at least a portion of the conductive pattern 240. In an example, the first through hole 421 may be filled with a resin, except for at least a portion of the conductive pattern 240.

According to an embodiment, the second through hole 422 may be filled with a dielectric material having a specific dielectric constant. In an example, the second through hole 422 may be filled with a resin.

Figure 5:
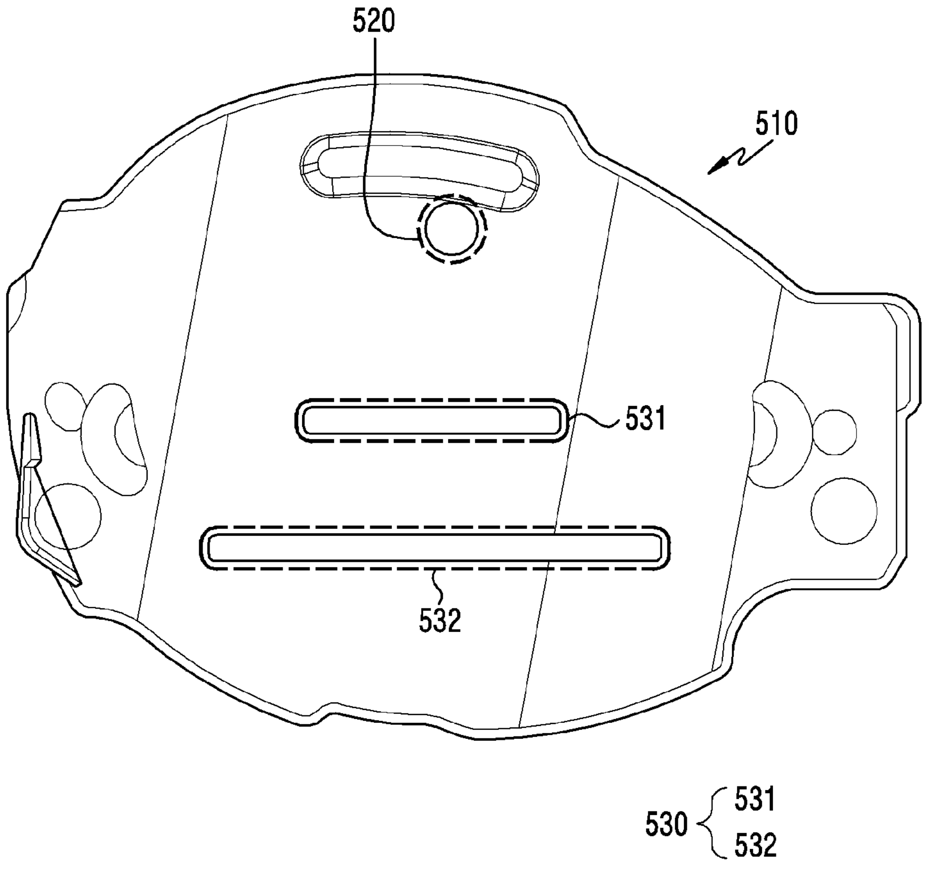
FIG. 5 illustrates an antenna carrier according to an embodiment different from that of FIG. 4A.

FIG. 5 illustrates an antenna carrier 510 according to an embodiment different from that of FIG. 4A.

Referring to FIG. 5, the antenna carrier 510 may have a configuration or shape different from that of the antenna carrier 230 illustrated in FIG. 2. However, only the configuration or shape of the antenna carrier 510 is different from that of the antenna carrier 230, and the electrical connection relationship of the antenna carrier 510 may be understood as being the same as that in the description of FIG. 2. For example, the antenna carrier 510 may be electrically connected to the wireless communication circuit 220 disposed on the printed circuit board 210 via a conductive pattern provided on the antenna carrier 510.

According to the embodiment of FIG. 5, the antenna carrier 510 may include a through hole 520, and/or one or more groove structures 530, such as a first groove structure 531, and/or a second groove structure 532.

According to the embodiment of FIG. 5, the through hole 520 may have the same configuration as the first through hole 421 illustrated in FIG. 4B. In an example, a conductive pattern may be formed through the through hole 520.

According to the embodiment of FIG. 5, the first groove structure 531 and the second groove structure 532 may be formed in the shape of a straight line.

In an example, the first groove structure 531 and the second groove structure 532 may be provided on one surface of the antenna carrier 510 to be parallel to and spaced apart from each other by a specific distance.

According to the embodiment of FIG. 5, when the electronic device 100 includes the antenna carrier 510 in which the first groove structure 531 and the second groove structure 532 are provided, a structural defect according to double injection molding (e.g., a weld line) may not occur in the electronic device 100.

According to an embodiment, a second through hole (not illustrated) may be provided in the antenna carrier 510 included in the electronic device 100. In an example, the second through hole included in the antenna carrier 510 may be understood to have substantially the same configuration as the second through hole 422. For example, when the electronic device 100 includes the second through hole included in the antenna carrier 510, the first groove structure 531, and the second groove structure 532, a structural defect (e.g., a weld line) of the external appearance of the electronic device 100 may not occur during the double injection molding of a non-conductive material (e.g., injection material).

According to an embodiment, a second through hole (not illustrated) may be disposed in the first groove structure 531 or the second groove structure 532. In an example, the second through hole may be disposed in each of the first groove structure 531 and the second groove structure 532. In another example, the second through hole may be disposed in any of the first groove structure 531 and the second groove structure 532.

Figure 6:
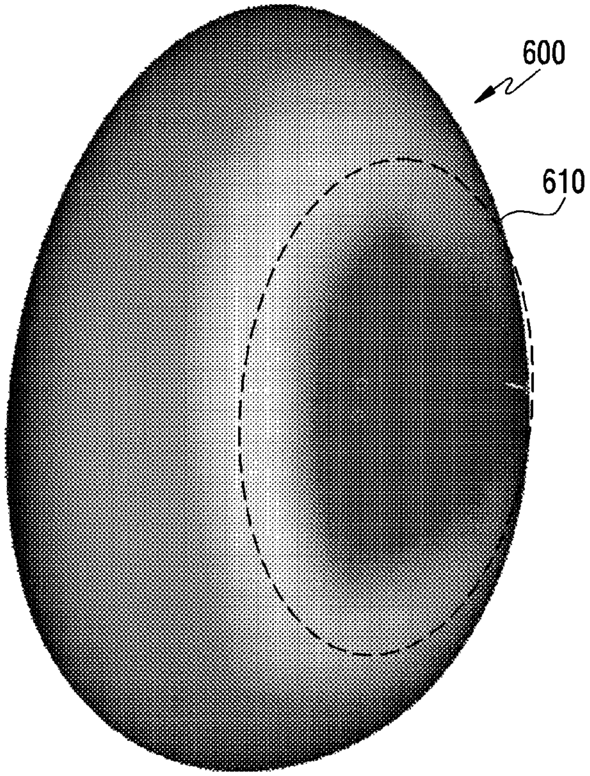
FIG. 6 illustrates a flow of air formed in the electronic device when a resin is injected into the electronic device according to an embodiment.

FIG. 6 illustrates a flow 600 of air formed in the electronic device 100 when a resin is injected into the electronic device 100 according to an embodiment.

Referring to FIG. 6, it can be understood that the darker the color of the air flow 600 formed in the electronic device 100, the higher the concentration of air.

According to an embodiment, when a non-conductive material (e.g., a resin) is injected into the electronic device 100, air may be stagnant in one area 610 of the electronic device 100.

According to an embodiment, the second through hole 422 may be provided at a position of the antenna carrier 230 that corresponds to the one area 610 of the electronic device 100 in which air is stagnant when a resin is injected into the electronic device 100.

Figure 7A:
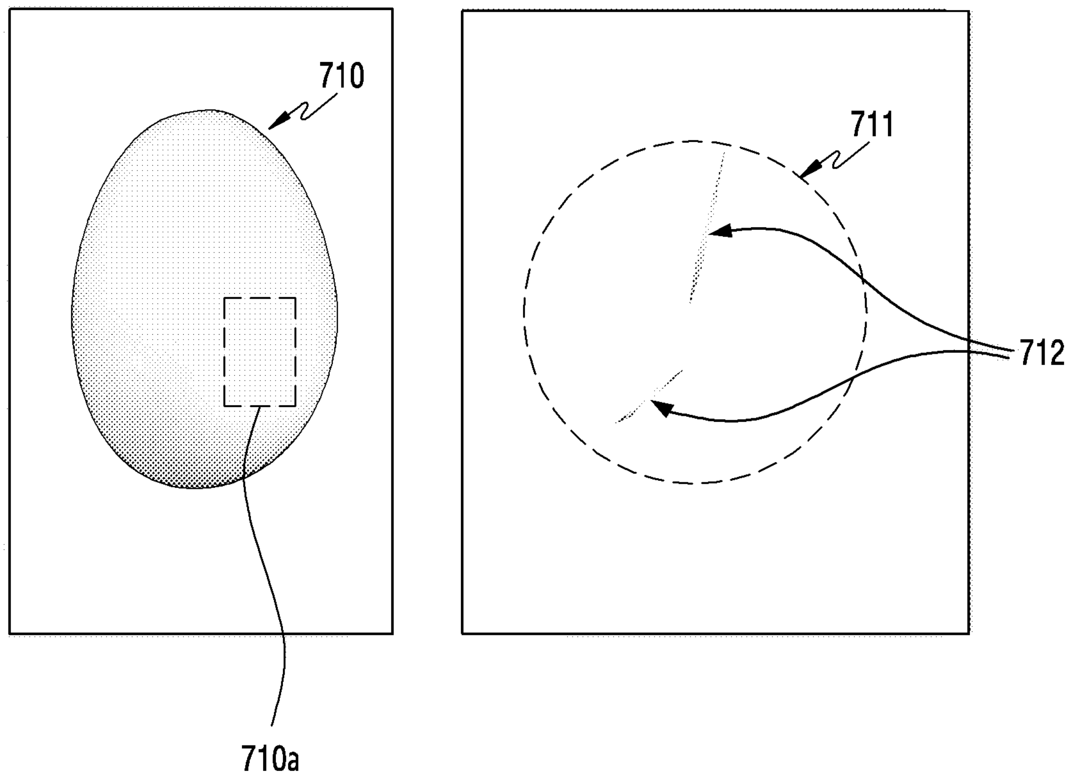
FIG. 7A illustrates an electronic device in which structural defects are present.
Figure 7B:
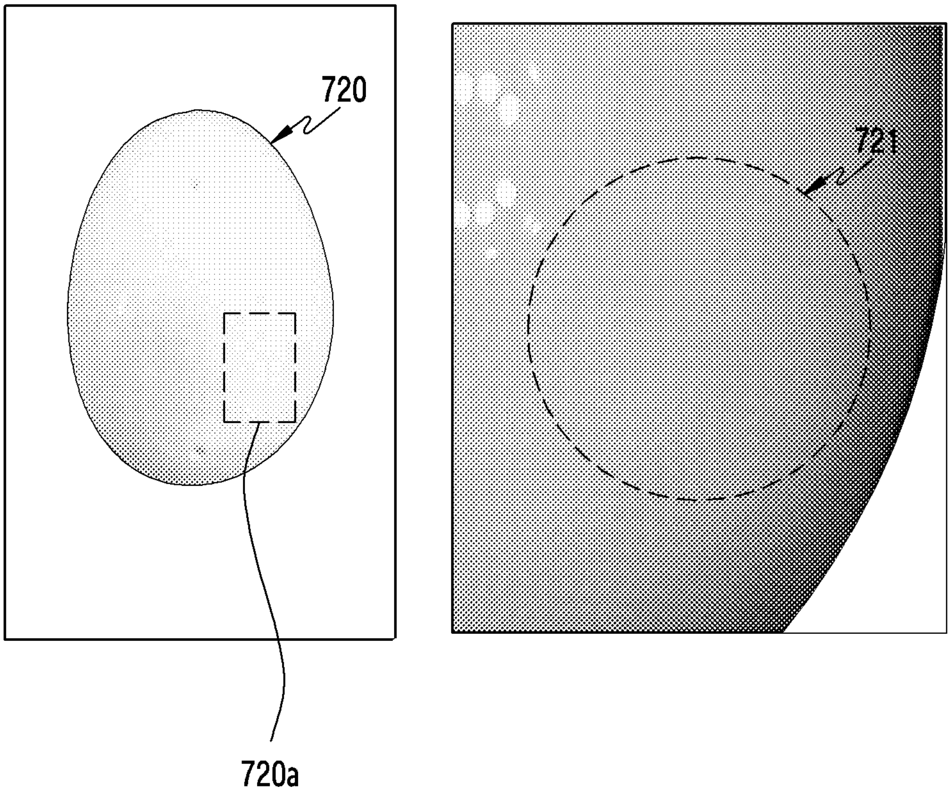
FIG. 7B illustrates an electronic device in which structural defects are not present.

FIG. 7A illustrates an electronic device 710 in which structural defects 712 are present. FIG. 7B illustrates an electronic device 720 in which structural defects are not present.

Referring to FIGS. 7A and 7B, the electronic device 710 may include an antenna carrier in which the second through hole 422 and the groove structure 410 are not provided, and the electronic device 720 may include an antenna carrier 230 in which the second through hole 422 and the groove structure 410 are provided.

According to an embodiment, a structural defect 711 may be formed in a first surface portion 710*a* of the electronic device 710. In an example, the structural defect 711 may include a weld line.

According to an embodiment, a smooth surface 721 may be formed on the second surface portion 720*a* of the electronic device 720. In an example, the smooth surface 721 may refer to a surface of the electronic device 100 in a state in which no structural defect is present.

TABLE 1

| Antenna carrier 230 | Variable | Low frequency band (LOW Ch, 2402 MHz) | Intermediate frequency band (MID Ch, 2441 MHz) | High frequency band (HIGH Ch, 2480 MHz) | Average |
|---|---|---|---|---|---|
| When second through hole and groove structure are not present | TIS [dBm] | 79.16 | 81.42 | 81.20 | 80.6 |
| | TRP [dBm] | 1.24 | 2.26 | 1.49 | 1.7 |
| When second through hole and groove structure are present | TIS [dBm] | 81.07 | 82.09 | 77.68 | 80.28 |
| | TRP [dBm] | 1.57 | 2.39 | 1.48 | 1.81 |

Referring to Table 1, in the case in which the second through hole 422 and the groove structure 410 are not provided in the antenna carrier 230 included in the electronic device 100 and in the case in which the second through hole 422 and the groove structure 410 are provided in the antenna carrier 230 included in the electronic device 100, the values of total isotropic sensitivity (TIS) and the values total radiated power (TRP) may not be substantially different.

According to an embodiment, even when the second through hole 422 and the groove structure 410 are provided in the antenna carrier 230 included in the electronic device 100, the quality of a wireless signal transmitted/received by the wireless communication circuit 220 via the conductive pattern 240 may be maintained.

Figure 8:
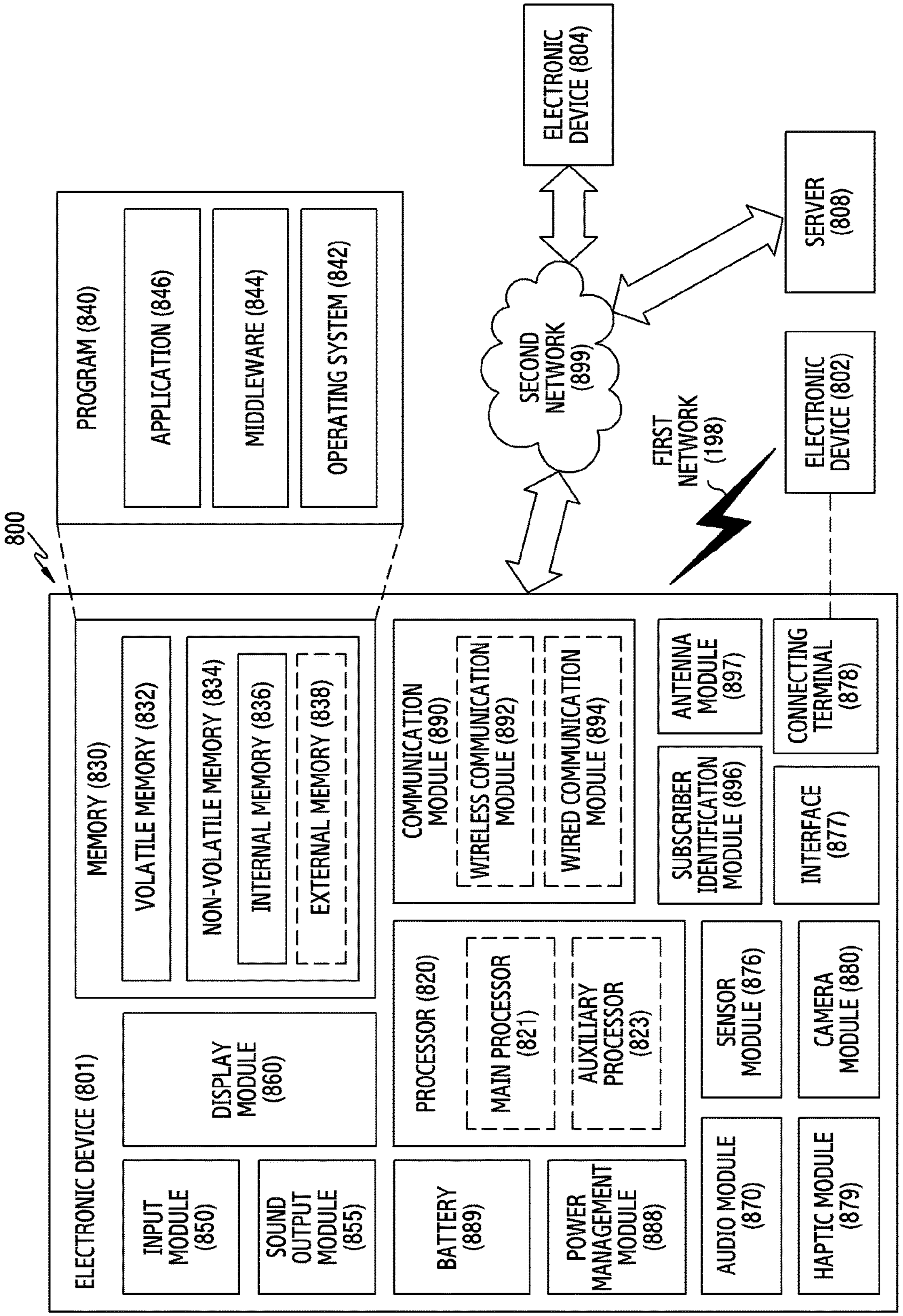
FIG. 8 is a block diagram of an electronic device according to various embodiments in a network environment.

FIG. 8 is a block diagram illustrating an electronic device 801 in a network environment 800 according to various embodiments. Referring to FIG. 8, the electronic device 801 in the network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of the functions or states related to at least one component (e.g., the display module 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (1-D-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

An ear-wearable electronic device according to various embodiments may include a first housing, a second housing including a protrusion to be seated on an ear and connected to the first housing, a printed circuit board disposed in an internal space defined by the first housing and the second housing, a wireless communication circuit disposed on the printed circuit board, an antenna carrier disposed in the internal space, and a conductive pattern provided over the first surface and the second surface through a first through hole among the through holes and electrically connected to the wireless communication circuit. The antenna carrier may include a first surface facing the protrusion, a second surface opposite to the first surface, and through holes passing therethrough, an area of the second surface of the antenna carrier may be provided with a groove structure including a point that is in contact with a second through hole among the through holes, and the wireless communication circuit may be configured to transmit and/or receive a wireless signal by providing power to one point of the conductive pattern located on the first surface.

According to an embodiment, at least a portion of the second through hole may be filled with a dielectric material having a specific dielectric constant.

The electronic device according to an embodiment may further include a conductive connection member, wherein the wireless communication circuit may be configured to feed power to the one point of the conductive pattern electrically connected to the conductive connection member.

According to an embodiment, one end of the groove structure may be seamlessly connected to the second surface, and the one end and the other end of the groove structure may be configured to have a specific height difference from the second surface.

According to an embodiment, the second through hole may have a diameter within a range not exceeding 0.8 mm.

According to an embodiment, the dielectric material having a specific dielectric constant may be a resin.

According to an embodiment, at least a portion of the first through hole may be filled with a dielectric material having a specific dielectric constant.

According to an embodiment, the conductive pattern may be provided at a position spaced apart from the second through hole.

According to an embodiment, when double injection molding may be performed inside the electronic device, air generated near the second surface of the antenna carrier due to the injection molding circulates by passing through the second through hole.

The electronic device according to an embodiment may further include a support member, wherein the printed circuit board may be seated in the internal space of the electronic device by the support member.

The electronic device according to an embodiment may further include a battery, wherein the battery may be disposed in the internal space to be adjacent to the second housing.

The electronic device according to an embodiment may further include a speaker, wherein the speaker may be disposed in the internal space to be adjacent to the protrusion.

According to an embodiment, the conductive pattern may be provided on the antenna carrier through a laser direct structuring (LDS) method.

According to an embodiment, when the first surface is viewed from the second surface, the second through hole may be included in an area of the second surface in which the groove structure is provided.

According to an embodiment, the antenna carrier may be disposed to be spaced apart from the protrusion seated on the ear.

A wearable electronic device according to various embodiments may include a first housing; a second housing including a protrusion to be seated on an ear and connected to the first housing, a printed circuit board disposed in an internal space defined by the first housing and the second housing, a wireless communication circuit disposed on the printed circuit board, an antenna carrier disposed in the internal space, and a conductive pattern provided over the first surface and the second surface through a first through hole among the through holes and electrically connected to the wireless communication circuit. The antenna carrier may include a first surface facing the protrusion, a second surface opposite to the first surface, and through holes passing therethrough, an area of the second surface of the antenna carrier may be provided with a groove structure including a point that is in contact with a second through hole among the through holes, at least a portion of the second through hole is filled with a dielectric material having a specific dielectric constant, and the wireless communication circuit may be configured to transmit and/or receive a wireless signal by providing power to one point of the conductive pattern located on the first surface.

The wearable electronic device according to an embodiment may further include a conductive connection member, wherein the wireless communication circuit may be configured to feed power to the one point of the conductive pattern electrically connected to the conductive connection member.

According to an embodiment, one end of the groove structure may be seamlessly connected to the second surface, and the one end and the other end of the groove structure may be configured to have a specific height difference from the second surface.

According to an embodiment, at least a portion of the first through hole may be filled with a dielectric material having a specific dielectric constant.

According to an embodiment, the conductive pattern may be provided at a position spaced apart from the second through hole.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An ear-wearable electronic device comprising:

a first housing;

a second housing including a protrusion configured to be seated on an ear and connected to the first housing;

a printed circuit board disposed in an internal space formed by the first housing and the second housing;

a wireless communication circuit disposed on the printed circuit board;

an antenna carrier disposed in the internal space, the antenna carrier including a first surface facing the protrusion, a second surface opposite to the first surface, and a plurality of through holes passing through the antenna carrier; and a conductive pattern formed over the first surface and the second surface through a first through hole of the plurality of through holes and electrically connected to the wireless communication circuit, wherein a groove structure including a point that is in contact with a second through hole of the plurality of through holes is formed on the second surface of the antenna carrier, and wherein the wireless communication circuit is configured to transmit and receive a wireless signal by providing power to a portion of the conductive pattern located on the first surface.

2. The electronic device of claim 1, wherein at least a portion of the second through hole is filled with a dielectric material having a specific dielectric constant.

3. The electronic device of claim 1, further comprising:

a conductive connection member electrically connected to the conductive pattern, wherein the wireless communication circuit is configured to feed power to the portion of the conductive pattern via the conductive connection member.

4. The electronic device of claim 1, wherein a first end of the groove structure is seamlessly connected to the second surface, and first end and a second end of the groove structure are formed to have a specific height difference from the second surface.

5. The electronic device of claim 1, wherein the second through hole has a diameter within 0.8 mm.

6. The electronic device of claim 1, wherein at least a portion of the first through hole is filled with a dielectric material having a specific dielectric constant.

7. The electronic device of claim 6, wherein the dielectric material having the specific dielectric constant is a resin.

8. The electronic device of claim 1, wherein the conductive pattern is formed at a position spaced apart from the second through hole.

9. The electronic device of claim 1, wherein the second through hole is configured to facilitate circulation of air near the second surface of the antenna carrier during an injection molding process performed inside the electronic device.

10. The electronic device of claim 1, further comprising:
a support member,
wherein the printed circuit board is seated in the internal space by the support member.

11. The electronic device of claim 1, further comprising:
a battery;
wherein the battery is disposed in the internal space adjacent to the second housing.

12. The electronic device of claim 1, further comprising:
a speaker,
wherein the speaker is disposed in the internal space adjacent to the protrusion.

13. The electronic device of claim 1, wherein the conductive pattern is formed on the antenna carrier through a laser direct structuring (LDS) method.

14. The electronic device of claim 1, wherein, when the first surface is viewed from the second surface, the second through hole is included in an area of the second surface in which the groove structure is formed.

15. The electronic device of claim 1, wherein the antenna carrier is disposed to be spaced apart from the protrusion seated on the ear.

16. A wearable electronic device comprising:
a first housing;
a second housing including a protrusion configured to be seated on an ear and connected to the first housing;
a printed circuit board disposed in an internal space formed by the first housing and the second housing;
a wireless communication circuit disposed on the printed circuit board;
an antenna carrier disposed in the internal space, the antenna carrier including a first surface facing the protrusion, a second surface opposite to the first surface, and a plurality of through holes passing through the antenna carrier; and
a conductive pattern provided over the first surface and the second surface and through a first through hole of the plurality of through holes, the conductive pattern electrically connected to the wireless communication circuit,
wherein a groove structure including a point that is in contact with a second through hole of the plurality of through holes is formed on the second surface of the antenna carrier,
wherein at least a portion of the second through hole is filled with a dielectric material having a specific dielectric constant, and
wherein the wireless communication circuit is configured to transmit and receive a wireless signal by providing power to a portion of the conductive pattern located on the first surface.

17. The wearable electronic device of claim 16, further comprising:
a conductive connection member electrically connected to the conductive pattern,
wherein the wireless communication circuit is configured to feed power to the portion of the conductive pattern via the conductive connection member.

18. The wearable electronic device of claim 16, wherein a first end of the groove structure is seamlessly connected to the second surface, and the first end and a second end of the groove structure are configured to have a specific height difference from the second surface.

19. The wearable electronic device of claim 16, wherein at least a portion of the first through hole is filled with a dielectric material having a specific dielectric constant.

20. The wearable electronic device of claim 16, wherein the first housing and the second housing are created via an injection molding process and wherein the second through hole is configured to facilitate circulation of air near the second surface of the antenna carrier during the injection molding process.

* * * * *